Dec. 26, 1944.  F. W. SCHWINN  2,366,061
FOLDING HANDLE BAR FOR BICYCLES
Filed Aug. 14, 1943
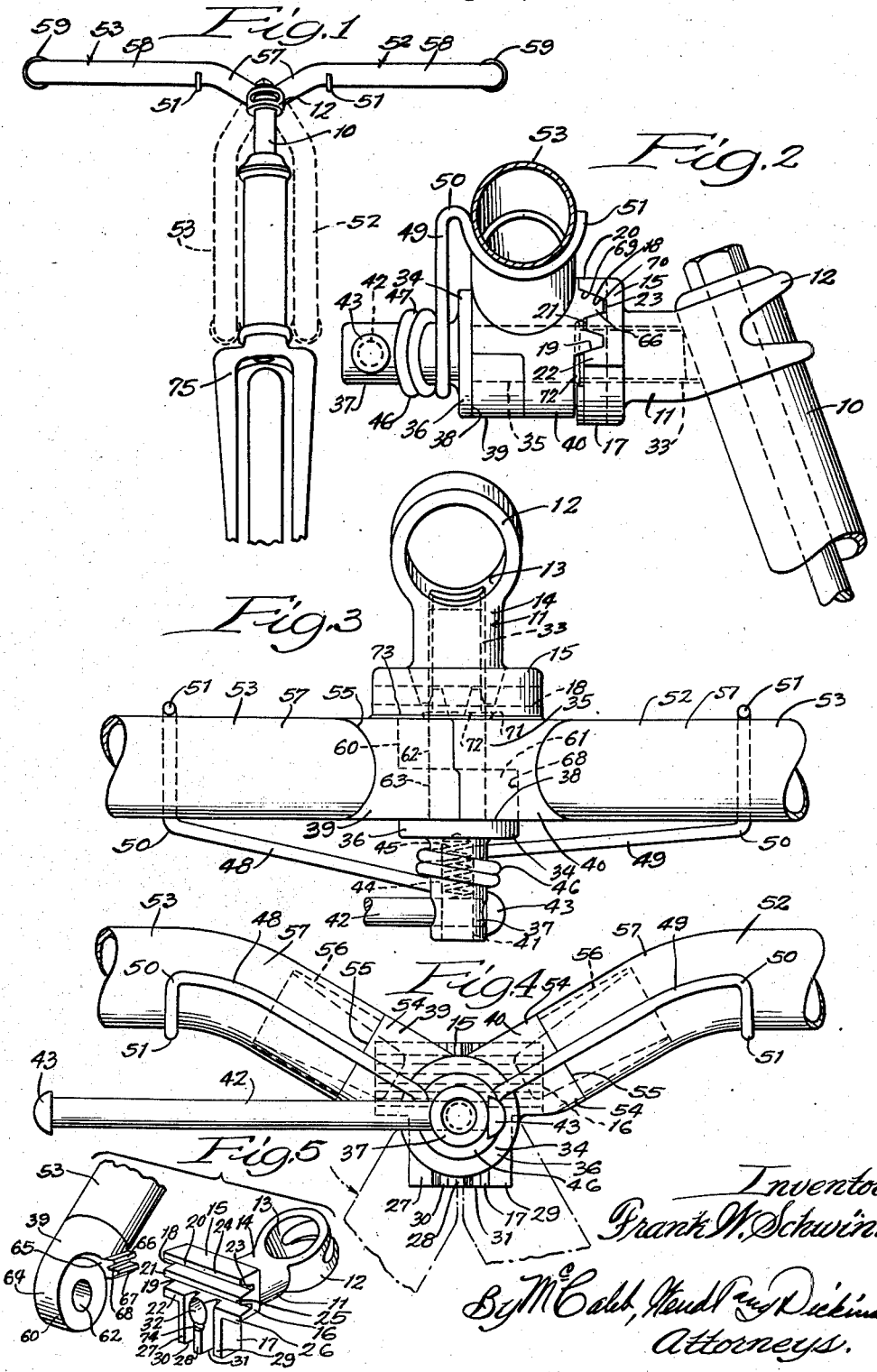
Inventor:
Frank W. Schwinn,
By McCaleb, Hendl and Dickinson
Attorneys.

Patented Dec. 26, 1944

2,366,061

UNITED STATES PATENT OFFICE 2,366,061

FOLDING HANDLE BAR FOR BICYCLES

Frank W. Schwinn, Chicago, Ill.

Application August 14, 1943, Serial No. 498,685

10 Claims. (Cl. 74—551.3)

The present invention relates to folding handle bars for bicycles, and while such folding handle bars may be employed upon any bicycle to advantage for the purpose of making the assembly more compact at the forward end of the bicycle, the present handle bars are preferably mounted in a complete folding bicycle assembly so that the complete assembly may be folded into a minimum amount of space.

One of the objects of the invention is the provision of an improved folding handle bar construction which is adapted to be automatically moved from the folded position to the operative position when the operator releases the securing devices which are holding it in its folded position.

Another object of the invention is the provision of an improved folding handle bar construction which includes handle bar members pivotally mounted upon a securing member, and in which the construction is such that most of the strain is taken by auxiliary inter-engaging members to relieve strains on the securing member.

Another object of the invention is the provision of an improved handle bar construction having means for interlocking the handle bars and their supporting fixture when the handle bars are in the folded or in the operative position, and also having means for automatically aligning the handle bars and the supporting fixture in proper position for the inter-engagement of their parts.

Another object of the invention is the provision of an improved handle bar construction which is simple, sturdy, and adapted to be manufactured at a low cost and adapted to be used for a long period of time without rattling or loosening or necessity for repair or replacement of any of its parts.

Another object of the invention is the provision of an improved handle bar construction which is particularly adapted to be moved from the folded position to the operative position very speedily in total darkness, and in which there is no possibility of misalignment of any of the elements of the construction when so operated.

Other objects and advantages of the invention will be apparent from the following description and the accompanying drawing, in which similar characters of reference indicate similar parts throughout the several views.

Referring to the single sheet of drawings accompanying this specification,

Fig. 1 is a fragmentary front elevational view of a bicycle equipped with folding handle bars constructed according to the invention, showing the handle bars in their operative position in full lines and the folded position in dotted lines;

Fig. 2 is a fragmentary side elevational view, with the right handle bar in section, showing the position which the parts assume when in operative position;

Fig. 3 is a fragmentary top plan view, showing the details of construction of the handle bar support in the same position;

Fig. 4 is a fragmentary rear elevational view, with the handle bars shown in full lines in operative position and in dotted lines in the folded position; and Fig. 5 is an exploded view, showing in perspective the details of construction of the extension section or supporting fixture for the handle bar and that end of the handle bar which is secured to this extension.

Referring to Fig. 1, 10 indicates the steering post, which is provided with a handle bar extension section 11, having an integral collar 12.

The collar 12 may have a cylindrical aperture 13, with a tight fit on the steering post 10, to which it may be brazed. The extension member 11 preferably has a tubular body 14, which extends at an angle diverging slightly from the right angle relation with respect to the axis of collar 12 and steering post 10 in order to bring the tubular body 14 into substantially horizontal position when the steering post 10 extends upwardly and rearwardly of a vertical position.

At its rear end the handle bar extension member 11 is provided with a substantially T-shaped enlargement 15, having a horizontal portion 16 and a vertical portion 17. The horizontal portion 16 is preferably formed with a plurality of grooves 18, 19, the grooves being bounded by the ribs 20, 21, and 22.

The grooves are preferably of substantially V shape, except that they have a flat base 23, thereby widening the grooves and permitting the use of ribs of greater width and strength. Thus, each of the ribs may have a substantially plane top at 24, 26.

The tops 25, 26 of the ribs 21, 22 are in substantially the same plane, but the top 24 of the rib 20 projects further than the ribs 21, 22, for a purpose further to be explained.

The vertical portion 17 of the T-shaped member 15 is also provided with the vertically extending ribs 27, 28, 29. These ribs bound the grooves 30, 31. In this case the flat upper ridge of the rib 28 is higher than the top of the ribs 27, 29, for a purpose further to be explained.

The tubular part 14 of the extension 11 and the head 15 are provided with a cylindrical through bore 32, which is threaded to receive the threaded portion 33 of a securing bolt 34.

This bolt may also have a cylindrical shank portion 35 and a flat circular head 36, with an axially extending hub 37. The head 36 may have an annular thrust surface 38 on its upper side in Fig. 3 for engaging the handle bar sections 39, 40. The hub 37 preferably has a transverse through bore 41 for receiving a small rod or pin 42, which serves as a handle for actuating the bolt 34.

The handle pin 42 may have both of its ends headed or riveted over, as indicated at 43, and it is slidably mounted in the bore 41 so that it can be moved to have either end of the handle pin 42 projecting, whichever may be convenient to the operator.

The transverse bore 41 in the hub 37 communicates with an axial bore 44 in the bolt 34 for housing a compression spring 45. The compression spring 45 bears against one end of the bore 44 and engages the handle pin 42 to hold the handle pin in any adjusted position to which it may be moved by the operator and to prevent rattling.

The hub 37 also serves the purpose of providing a central support for a spring 46, which is arranged and adapted to move the handle bars from the folded dotted line position of Fig. 1 to the full line position of Fig. 1.

The spring 46 may have a plurality of helical coils at its central portion 47, the helical coils being wrapped about the hub 37 between the head 36 and the handle pin 42. Each end of the central portion 47 may have a tangentially extending straight spring portion 48, 49, which extends laterally and is bent forwardly at 50 in each case so that it may be provided with a partially circular portion 51 for engaging the lower part of each handle bar 52, 53.

The spring 46 is so tensioned that it urges the handle bars upward, but they may be moved against the tension of the spring downward to the dotted line position of Fig. 1.

The handle bars 52, 53 are carried by two handle bar pivot members 39, 40. These pivot members, with the handle bar extension member 11, are preferably machined forgings. The pivot members 39, 40 are each substantially cylindrical at the points 54, where they are also provided with annular shoulders 55 and reduced cylindrical tubular portions 56 for reception in the tubular handle bars 52, 53.

The handle bar tubes 52, 53 are preferably a tight fit on the reduced cylindrical portions 56 of the members 39, 40, to which they are also brazed. The handle bars preferably extend diagonally upward and laterally from the members 39, 40, these diagonal portions being indicated by numerals 57 (Fig. 1), and the major portion of the handle bars comprises the laterally extending portion 58.

The handle bars may have rearwardly extending portions provided with grips 59, or they may be merely straight laterally extending handle bars with grips at their outer ends.

Each of the pivot members 39, 40 for the handle bars is provided with a pivot portion 60, 61, having a centrally located cylindrical bore 62 for passing the shank of the bolt 35, which shank 63 is also substantially cylindrical. The pivot portions 60, 61 are equal in thickness to one-half of the distance between the head 36 of the bolt and the face of the head 15 on the saddle bar extension 11, so that the pivot portions 60 may be clamped against the face of the saddle bar extension by the head 36 of the bolt 35.

These pivot portions 60, 61 may have substantially cylindrical outer surfaces 64, since these surfaces on each pivot portion oppose the surface 65 on the larger cylindrical portion 54 of these forgings. Thus, each of the pivot members 39, 40 occupies only half of the length of the shank 63 of the bolt 35, and the two pivot members 39, 40 have a limited range of rotation on the bolt 35 from the horizontal position of Fig. 1, in full lines, to the substantially vertical dotted line position of that figure.

In order to secure the handle bars positively in fixed position and to relieve the securing bolt from strains, each of the pivot members 39, 40 is provided with one or more, preferably two, ribs or teeth 66, 67 adapted to be received in the grooves 18, 19, when the handle bars are up; and one of these teeth, that is, the tooth 67, is received in the groove 30 or 31, when the handle bars are down. The teeth 66, 67 are the same shape as previously described with respect to the grooves, and they are separated by a groove 68, which is also the same shape, and in particular adapted to receive the rib 21, 27, or 29.

The ribs 66, 67 and grooves 68 are so located that they extend horizontally for inter-engagement with grooves 18, 19 and rib 21 when the handle bars are substantially horizontal. This involves the location of the ribs 66, 67 slightly above the axis of the bore 62.

Referring to Fig. 3 and Fig. 5, the bearing portion 60 on the handle bar extension 40 is of similar shape to the one shown in Fig. 5, except that this is the most forward of the two collars; and it has the partially cylindrical surface 68 (Fig. 3) for permitting rotation with respect to the cylindrical surface 64 on the pivot portion 60 of the member 39. It has similar teeth 66, 67, separated by a groove 68 on its upper side in Fig. 3 for engaging in the right ends of grooves 18, 19 and over the rib 21 of the saddle bar extension 11 of Fig. 5.

When the handle bars are in the horizontal position shown in full lines in Fig. 1 and illustrated in Figs. 2 to 4, the ribs 66, 67 of each handle bar are in the end portions of grooves 18, 19, that is, the horizontal portions of the T-shaped head 15.

When the handle bars are folded in the dotted line position of Fig. 1, the rib 27 on the T-shaped head 15 (Fig. 5) is in the groove 68 of the left handle bar extension 39. Also, the rib 29 on the right side of T-shaped head 15 of the extension 11 is located in the groove 68 of the right hand handle bar pivot member 40.

It has been previously pointed out that the uppermost rib 20 is of greater height than the ribs 21, 22. That additional height of the rib 20 permits the side surface 69 of the groove 18 to serve as a stop surface for engaging the side surface 70 of the rib 66 on the handle bar and preventing any further upward pivotal motion of the handle bar.

The construction of the bolt and pivot members 39, 40 is such that when the bolt is withdrawn these pivot members 39, 40 are also withdrawn from the saddle bar extension 11, removing ribs 66, 67 from their grooves 18, 19, 30, or 31.

This axial movement of the handle bar pivot members 39, 40 is accomplished by providing the bolt 35 with a thrust member 71 (Fig. 3) in the form of a spring wire which is sprung into an annular groove 72 of semi-circular cross section, located in the shank 63 of the bolt 35 at that face 73 of the pivot member 40 which is uppermost in Fig. 3.

In order to provide room for this spring wire 71, it is only necessary to cut a recess for it at 74 in the rib 28 adjacent bore 32 because the bore 32 is located adjacent grooves 19, 30, and 31, which already provide space for the wire 71.

The operation of this thrust member 71 is as follows: When the bolt 35 is retracted by being turned, it progresses outward of the threaded bore 32, and the thrust member 71 causes the bolt to carry with it the handle bar pivot members 39, 40 and the handle bars 52, 53.

This withdraws the ribs 66, 67 from the grooves in which they happen to be located. When the bolt is in this withdrawn position, the top flat surfaces of ribs 66, 67 are able to clear the top flat surfaces of ribs 21, 22 or 27 or 29, but they do not clear the higher rib 20. Instead, the side surface 70 of the rib 66 engages the side surface 69 of the rib 20, providing a definite stop for the upward pivotal movement of the handle bars and locating the ribs 66, 67 so that they are ready to go into the grooves 18, 19 when the screw bolt 25 is again driven home in a clockwise direction.

It has already been described that the vertically extending rib 28 (Fig. 5) on the lower part of the T-shaped head 15 is higher than the ribs 27, 29. This is for the purpose of providing another definite stop for engaging the side surface of the ribs 67 when those ribs are moved down to the vertical position at the time the handle bars are moved to the vertical dotted line position of Fig. 1.

The operation of the folding handle bar is as follows: The handle bars 52, 53 may be secured in the dotted line position of Fig. 1 to fold them into more compact space.

It will be observed that in Fig. 1 they are preferably of such length that they do not interfere with the fork 75. When in this position, each tooth 67 of a handle bar is located in a groove 30 or 31. Each vertical tooth 27, 29 on the extension 11 is located in a groove 68 of the pivot members 39 or 40.

The bolt 35 is driven home in its threaded bore 32; holding these ribs in inter-engaging position. The spring 46 is tensioned and ready to move the handle bars to operative position, but the force of the spring is opposed by the inter-engaging ribs.

When the operator desires to use the bicycle, it is only necessary for him to rotate the threaded bolt 35 by means of its handle, with which the bolt is rotated in a counterclockwise direction.

As the bolt 35 is withdrawn, its thrust member 71 also withdraws the pivot members 39, 40 of the handle bars and the ribs 66, 67 from engagement with the ribs and grooves of the handle bar extension 11. When the ribs 66, 67 clear the ribs 27 and 29, then rotation of the handle bars on the bolt 35 is permitted, and spring 46 automatically moves the handle bars up to the horizontal position. Then the sides of ribs 66 engage the side of the higher rib 20 to act as a stop surface, preventing further upward movement of the handle bars.

This stops the handle bars in such position that ribs 66, 67 are in alignment with the grooves 18, 19, into which they are to be driven.

The screw bolt 35 may then be rotated in a clockwise direction, driving ribs 66, 67 of each handle bar into the grooves 18, 19 and securing the handle bars in their horizontal position. Thus, the handle bars may be unfolded and moved into operative position and secured there without any attention of the operator except to loosen the bolt 35 and tighten it again.

The present construction is peculiarly adapted to be used for military purposes, where it may be necessary to operate the mechanism in the dark or quickly on a moment's notice.

When it is desired to fold the handle bars, it is only necessary to retract the bolt 35 again, thus withdrawing the ribs 66, 67 from the grooves 18, 19; and when such a point is reached that the handle bars may be pivoted downward, then they are both moved downward by hand, tensioning the spring 46 until the rib 67 in each case hits the side of the rib 28, which acts as a stop surface to effect an alignment of the ribs 67 with the grooves 30, 31. While the operator holds the handle bars in this position, he then tightens the bolt 35 again to secure the handle bars in folded position.

It will thus be observed that I have invented an improved handle bar construction in which the handle bars may be unfolded immediately and in which they automatically seek their proper position of alignment with the inter-engaging ribs so located that they will secure the handle bars in proper position by means of the tightening of a single bolt.

The unfolding of the handle bars is automatic and instantaneous, and the handle bars are so secured by this single bolt that the strain is taken by the inter-engaging ribs and grooves on machined forgings, which are well adapted to withstand the strains.

The present construction is simple and adapted to be manufactured at a low cost and capable of use for a long period of time without necessity for repair or replacement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a handle bar structure, the combination of an extension fixture adapted to be carried by a steering post, said fixture having a substantially T-shaped face, said face being provided with substantially horizontal ribs and grooves, and said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture.

2. In a handle bar structure, the combination of an extension fixture adapted to be carried by a steering post, said fixture having a substantially T-shaped face, said face being provided with substantially horizontal ribs and grooves, and said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture, said fixture also having substantially vertically extending ribs and grooves for interlocking engagement with the ribs and grooves on said handle bars when the handle bars are in folded position.

3. In a handle bar structure, the combination of an extension fixture adapted to be carried by a steering post, said fixture having a substantially T-shaped face, said face being provided with substantially horizontal ribs and grooves, and said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture, the uppermost of the ribs on said fixture being of greater depth to provide a stop surface on its side for engaging the uppermost surface on the ribs of said handle bars, to effect an alignment of the ribs and grooves of handle bars and fixture when handle bars are in the operative position.

4. In a handle bar structure, the combination of an extension fixture adapted to be carried by a steering post, said fixture having a substantially T-shaped face, said face being provided with substantially horizontal ribs and grooves and said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture, said bolt having a head engaging said handle bars, and said head having an axially extending hub provided with a handle for actuating said bolt.

5. In a handle bar structure, the combination of an extension fixture adapted to be carried by a steering post, said fixture having a substantially T-shaped face, said face being provided with substantially horizontal ribs and grooves, and said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture, said bolt having a head engaging said handle bars and said head having an axially extending hub provided with a handle for actuating said bolt, said handle comprising a metal rod slidably mounted in a bore in said hub.

6. In a handle bar structure, the combination of an extension fixture adapted to be carried by a steering post, said fixture having a substantially T-shaped face, said face being provided with substantially horizontal ribs and grooves, said fixture having a threaded bore in said face, a threaded bolt in said bore, a pair of handle bars pivotally mounted on said bolt, said handle bars being provided with ribs and grooves extending in substantially horizontal direction when the handle bars are in operative position, for interlocking engagement with the ribs and grooves on said fixture, said bolt having a head engaging said handle bars, and said head having an axially extending hub provided with a handle for actuating said bolt, an actuating spring carried by said hub, and having portions urging each of said handle bars from folded to operative position.

7. In a folding handle bar construction, a connecting structure between a handle bar and a steering post extension fixture comprising a substantially T-shaped head on said fixture, said head being provided with a centrally located threaded bore and having the top of the head formed with a pair of transversely extending grooves separated by a ridge, the stem of said T also being provided with a pair of grooves extending downward and separated by a ridge, the ridge being penetrated by said bore, a pair of handle bar supporting fixtures, each of the latter being provided with a reduced portion to be received in a tubular handle bar, each of said handle bar supporting fixtures being formed with a bearing portion having a through bore and with a body portion having a substantially axially projecting pair of ribs separated by a groove, said groove being located to receive either the rib on the top of the T-shaped steering post fixture or the rib on the stem of the T-shaped steering post fixture, and threaded means located in said bore and adapted to hold said fixtures in tight immovable engagement relative to each other in either of two positions.

8. In a folding handle bar construction, a connecting structure between a handle bar and a steering post extension fixture comprising a substantially T-shaped head on said fixture, said head being provided with a centrally located threaded bore and having the top of the head formed with a pair of transversely extending grooves separated by a ridge, the stem of said T also being provided with a pair of grooves extending downward and separated by a ridge, the ridge being penetrated by said bore, a pair of handle bar supporitng fixtures, each of the latter being provided with a reduced portion to be received in a tubular handle bar, each of said handle bar supporting fixtures being formed with a bearing portion having a through bore and with a body portion having a substantially axially projecting pair of ribs separated by a groove, said groove being located to receive either the rib on the top of the T-shaped steering post fixture or the rib on the stem of the T-shaped steering post fixture, and threaded means located in said bore and adapted to hold said fixtures in tight immovable engagement relative to each other in either of two positions, said threaded means comprising a cylindrical threaded member provided with a head for engaging the adjacent bearing portion of a handle bar fixture, said head projecting axially and being provided with a transverse slidable bar for actuation of the threaded member.

9. In a folding handle bar construction, a connecting structure between a handle bar and a steering post extension fixture comprising a substantially T-shaped head on said fixture, said head being provided with a centrally located threaded bore and having the top of the head formed with a pair of transversely extending grooves separated by a ridge, the stem of said T also being provided with a pair of grooves extending downward and separated by a ridge, the ridge being penetrated by said bore, a pair of handle bar supporting fixtures, each of the latter being provided with a reduced portion to be received in a tubular handle bar, each of said handle bar supporting fixtures being formed with a bearing portion having a through bore and with a body portion having a substantially axially projecting pair of ribs separated by a groove, said groove being located to receive either the rib on the top of the T-shaped steering post fixture or the rib on the stem of the T-shaped steering post fixture, and threaded means located in said bore and adapted to hold said fixtures in tight immovable engagement relative to each other in either of two positions, said threaded means comprising a cylindrical threaded member provided with a head for engaging the adjacent bearing portion of a handle bar fixture, said head projecting axially and being provided with a transverse slidable bar for actuation of the threaded member, the said projecting portion of said head carrying a helical spring having outwardly projecting arms for engaging handle bars and urging them to the riding position.

10. In a folding handle bar construction, a connecting structure between a handle bar and a steering post extension fixture comprising a substantially T-shaped head on said fixture, said head being provided with a centrally located threaded bore and having the top of the head formed with a pair of transversely extending grooves separated by a ridge, the stem of said T also being provided with a pair of grooves extending downward and separated by a ridge, the ridge being penetrated by said bore, a pair of handle bar supporting fixtures, each of the latter being provided with a reduced portion to be received in a tubular handle bar, each of said handle bar supporting fixtures being formed with a bearing portion having a through bore and with a body portion having a substantially axially projecting pair of ribs separated by a groove, said groove being located to receive either the rib on the top of the T-shaped steering post fixture or the rib on the stem of the T-shaped steering post fixture, and threaded means located in said bore and adapted to hold said fixtures in tight immovable engagement relative to each other in either of two positions, the said steering post fixture having at its uppermost portion a transversely extending rib of greater altitude than the rib between its grooves to act as a stop surface for engaging the adjacent ribs on the handle bar-supporting fixtures when they are moved to riding position.

FRANK W. SCHWINN.